(12) United States Patent
Huh

(10) Patent No.: US 12,344,101 B2
(45) Date of Patent: Jul. 1, 2025

(54) METHOD OF CONTROLLING INERTIA DRIVING OF AN ELECTRIFIED VEHICLE

(71) Applicants: HYUNDAI MOTOR COMPANY, Seoul (KR); KIA CORPORATION, Seoul (KR)

(72) Inventor: Jeewook Huh, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 628 days.

(21) Appl. No.: 17/390,155

(22) Filed: Jul. 30, 2021

(65) Prior Publication Data

US 2022/0176831 A1    Jun. 9, 2022

(30) Foreign Application Priority Data

Dec. 4, 2020   (KR) .................. 10-2020-0168829

(51) Int. Cl.
G06F 17/00 (2019.01)
B60L 15/20 (2006.01)
G07B 15/06 (2011.01)
G08G 1/052 (2006.01)

(52) U.S. Cl.
CPC ........ B60L 15/2009 (2013.01); G07B 15/063 (2013.01); G08G 1/052 (2013.01); B60L 2240/12 (2013.01); B60L 2240/14 (2013.01); B60L 2240/622 (2013.01); B60L 2240/70 (2013.01); B60L 2260/22 (2013.01)

(58) Field of Classification Search
CPC ............. B60L 15/2009; B60L 2240/12; B60L 2240/14; B60L 2240/622; B60L 2240/70; B60L 2260/22; G07B 15/063; G08G 1/052; B60W 30/18072; B60W 2555/60; B60W 2556/50; B60W 2720/10; B60W 10/08; B60W 40/105; B60W 2520/10; B60Y 2200/92; B60Y 2300/18066; Y02T 10/62; Y04S 10/126
USPC ........................................................ 701/22
See application file for complete search history.

(56) References Cited

U.S. PATENT DOCUMENTS

| | | | |
|---|---|---|---|
| 9,213,217 B2* | 12/2015 | Mori | H04N 23/73 |
| 10,943,273 B2* | 3/2021 | Hoffberg | G06Q 30/0207 |
| 11,386,720 B2* | 7/2022 | Takahashi | B60W 40/02 |
| 2018/0173236 A1* | 6/2018 | Yashiro | B60W 30/18163 |
| 2018/0222482 A1* | 8/2018 | Kato | B60W 30/18009 |
| 2019/0001984 A1 | 1/2019 | Huh et al. | |
| 2020/0043247 A1* | 2/2020 | Takahashi | G08G 1/09 |

OTHER PUBLICATIONS

Navigating Automated Vehicle through Expressway Toll Gate (Year: 2018).*
Navigating Automated Vehicle through Expressway Toll Gate (Year: 2018) (Year: 2018).*

* cited by examiner

*Primary Examiner* — Ronnie M Mancho
(74) *Attorney, Agent, or Firm* — Lempia Summerfield Katz LLC

(57) ABSTRACT

A method of controlling inertia driving of an electrified vehicle includes: determining, by a controller, a target speed of an electrified vehicle based on a type of tollgate in front of the electrified vehicle; and controlling, by the controller, a drive motor of the electrified vehicle so that the electrified vehicle performs inertia driving to be decelerated to the target speed.

5 Claims, 2 Drawing Sheets

METHOD OF CONTROLLING INERTIA DRIVING OF AN ELECTRIFIED VEHICLE

CROSS-REFERENCE TO RELATED APPLICATION

This application claims priority to and the benefit of Korean Patent Application No. 10-2020-0168829 filed in the Korean Intellectual Property Office on Dec. 4, 2020, the entire contents of which are incorporated herein by reference.

BACKGROUND

(a) Field of the Disclosure

The present disclosure relates to an electrified vehicle, and more particularly, to a method of controlling inertia driving of an electrified vehicle.

(b) Description of the Related Art

An environment-friendly vehicle includes a fuel cell vehicle, an electric vehicle, a plug-in electric vehicle, and a hybrid vehicle and generally includes a motor for generating driving force.

The hybrid vehicle that is an example of an environment-friendly vehicle uses an internal combustion engine and a battery power source together. In other words, the hybrid vehicle efficiently combines and uses power of the internal combustion engine and power of the motor.

The hybrid vehicle may be formed of: an engine; a motor; an engine clutch intermittently transmitting power between the engine and the motor; a transmission; a differential gear device; a battery; a starter-generator, which starts the engine or generates power by an output of the engine; and vehicle wheels.

Further, the hybrid vehicle may be formed of: a hybrid control unit, which controls the overall operation of the hybrid vehicle; an engine control unit, which controls an operation of the engine; a motor control unit, which controls an operation of the motor; a transmission control unit, which controls an operation of the transmission; and a battery control unit, which controls and manages the battery.

The battery control unit may be called a battery management system. The starter-generator may also be called an integrated starter & generator (ISG) or a hybrid starter & generator (HSG).

The hybrid vehicle may be operated in: a driving mode, such as an electric vehicle (EV) mode that is a pure electric vehicle mode using only power of the motor; a hybrid electric vehicle (HEV) mode that uses rotation power of the engine as the main power and rotation power of the motor as auxiliary power; and a regenerative braking mode, which recovers braking and inertia energy through generation of the motor during braking or travelling by inertia of the vehicle and charges the battery.

The above information disclosed in this Background section is only to enhance understanding of the background of the present disclosure. Therefore, the Background section may contain information that does not form the prior art that is already known in this country to a person of ordinary skill in the art.

SUMMARY

The present disclosure has been made in an effort to provide a method of controlling inertia driving of an electrified vehicle, which determines a target speed of inertia driving of a vehicle depending on a type of a tollgate that is a deceleration event in front of the vehicle.

An embodiment of the present disclosure provides a method of controlling inertia driving of an electrified vehicle. The method includes: determining, by a controller, a target speed of an electrified vehicle based on a type of tollgate in front of the electrified vehicle; and controlling, by the controller, a drive motor of the electrified vehicle so that the electrified vehicle performs inertia driving to be decelerated to the target speed based on the target speed of the electrified vehicle.

The method of controlling inertia driving of an electrified vehicle may further include determining, by the controller, whether a general tollgate, in which a toll collection system for collecting road tolls through wireless communication is not installed, is located on a general road on which the electrified vehicle is to travel based on information received from a navigation device of the electrified vehicle. When the general tollgate is located on the general road, the controller may determine a target speed of the electrified vehicle in the general tollgate to 0.

The method of controlling inertia driving of an electrified vehicle may further include determining, by the controller, whether a non-stop tollgate, which does not require deceleration of the electrified vehicle because a toll collection system for collecting road tolls through wireless communication is installed, is located on a highway on which the electrified vehicle is to travel based on information received from a navigation device of the electrified vehicle. When the non-stop tollgate is located on the highway, the controller may determine a speed limit of the highway that is not related to an inertia driving speed of the electrified vehicle as a target speed of the electrified vehicle in the non-stop tollgate.

The method of controlling inertia driving of an electrified vehicle may further include, when the non-stop tollgate is not located on the highway, determining, by the controller, whether a general tollgate, in which a toll collection system for collecting road tolls through wireless communication is not installed, is located on the highway based on the information received from the navigation device. When the general tollgate is located on the highway, the controller may determine a target speed of the electrified vehicle in the general tollgate to 0.

The method of controlling inertia driving of an electrified vehicle may further include, when the general tollgate is not located on the highway, determining, by the controller, whether a signal indicating whether the toll collection system is used in the electrified vehicle is received from the navigation device and whether a first tollgate is located on the highway. When the signal indicating that the toll collection system is not used in the electrified vehicle is received from the navigation device and the first tollgate is located on the highway, the controller may determine the target speed of the electrified vehicle in the first tollgate to 0.

The method of controlling inertia driving of an electrified vehicle may further include, when the signal indicating that the toll collection system is used in the electrified vehicle is received from the navigation device and the first tollgate is not located on the highway, determining, by the controller, whether a smart card that pays tolls of a vehicle is inserted into a vehicle terminal of the toll collection system and a second tollgate is located on the highway. When the smart card is not inserted into the vehicle terminal of the toll collection system and the second tollgate is located on the highway, the controller may determine the target speed of the electrified vehicle in the second tollgate to 0.

The method of controlling inertia driving of an electrified vehicle may further include determining, by the controller, whether a wide tollgate, which has two or more roads and the toll collection system installed, is located on the highway based on the information received from the navigation device. When a difference between a speed limit of the highway and a speed limit of a road of the wide tollgate may be equal to or smaller than a reference value, and when the wide tollgate is located on the highway, the controller may determine the speed limit of the road of the wide tollgate as a target speed of the electrified vehicle in the wide tollgate.

The method of controlling inertia driving of an electrified vehicle may further include determining, by the controller, whether an open tollgate, which does not issue a road ticket of the highway, has the toll collection system installed, and is located within a main road of the highway, is located on the highway based on the information received from the navigation device. When the open tollgate is located on the highway, the controller may determine a speed limit of the highway that is not related to an inertia driving speed of the electrified vehicle as a target speed of the electrified vehicle in the open tollgate.

The method of controlling inertia driving of an electrified vehicle may further include determining, by the controller, whether a closed tollgate, which issues a road ticket of the highway, has the toll collection system installed, and is located on a road separated from a main road of the highway, is located on the highway based on the information received from the navigation device. When the closed tollgate is located on the highway, the controller may determine a speed limit of the road of the closed tollgate as the target speed of the electrified vehicle in the closed tollgate.

The method of controlling inertia driving of an electrified vehicle according to the embodiment of the present disclosure may determine a target vehicle speed of inertia driving depending on the type of tollgate that is a deceleration event in front of a vehicle. Accordingly, fuel efficiency of the electrified vehicle may be improved.

BRIEF DESCRIPTION OF THE DRAWINGS

In order to help more full understanding of the drawings used in the detailed description of the present disclosure, a brief description of each drawing is provided.

DETAILED DESCRIPTION OF THE EMBODIMENTS

Figure 1:
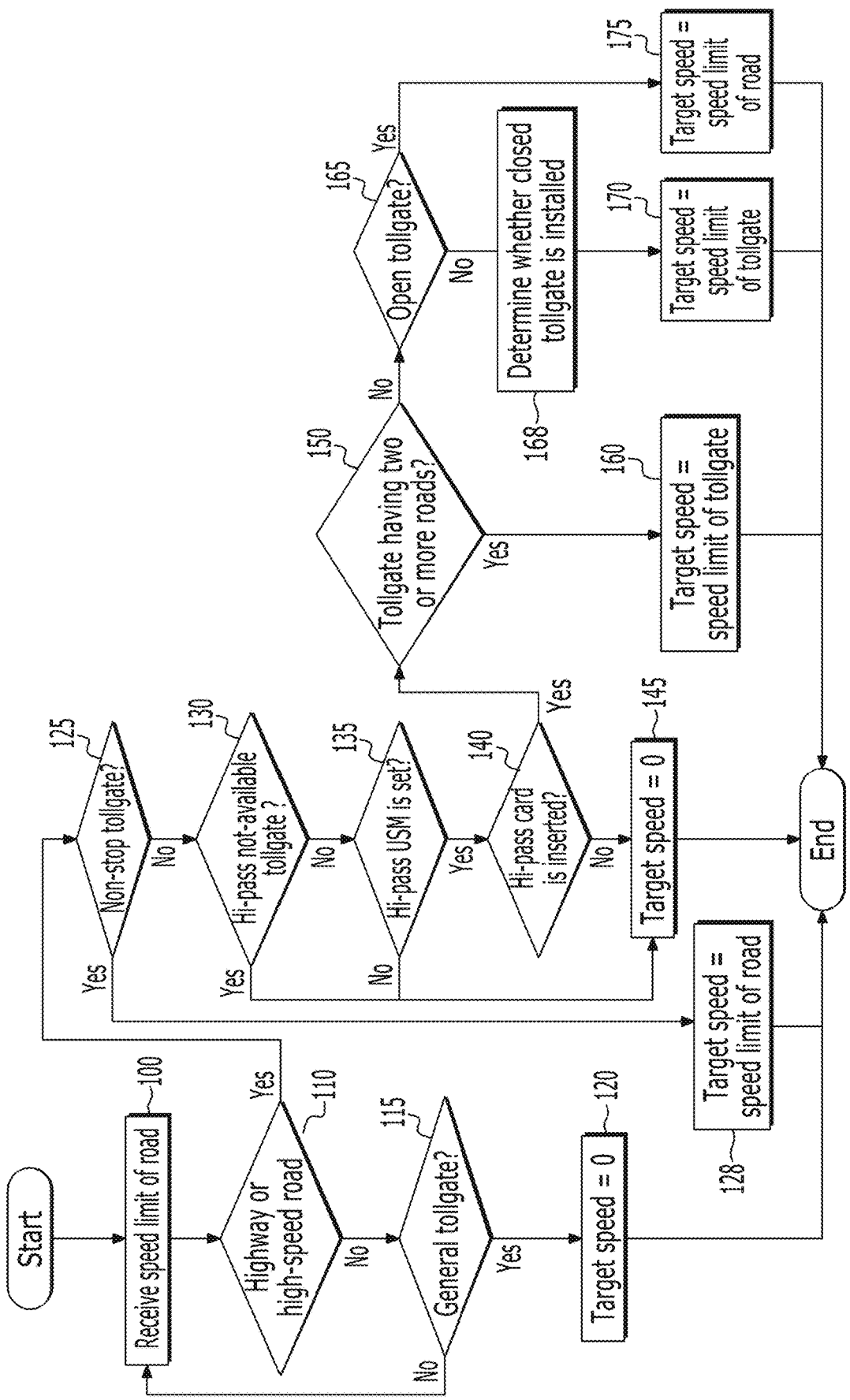
FIG. 1 is a flowchart for describing a method of controlling inertia driving of an electrified vehicle according to an embodiment of the present disclosure.

In order to fully understand the present disclosure and the object achieved by carrying out the present disclosure, reference should be made to the accompanying drawings illustrating embodiments of the present disclosure and the contents disclosed in the accompanying drawings.

Hereinafter, the present disclosure is described in detail by describing the embodiments of the present disclosure with reference to the accompanying drawings. In the following description of the embodiment, a detailed description of known configurations or functions incorporated herein has been be omitted when it is determined that the detailed description may make the subject matter of the present disclosure unclear. Like reference numerals presented in each drawing designate like elements throughout the specification.

The terms used in the present specification are simply used for describing a specific embodiment and are not intended to limit the present disclosure. A singular expression includes a plural expression unless it is specifically described to the contrary in the context. In the present specification, it should be appreciated that terms "including" and "having" are intended to designate the existence of characteristics, numbers, steps, operations, constituent elements, and components described in the specification or a combination thereof. These terms do not exclude a possibility of the existence or addition of one or more other characteristics, numbers, steps, operations, constituent elements, and components, or a combination thereof in advance.

Throughout this specification, when it is described that an element is "coupled" to another element, the element may be "directly coupled" to another element or "electrically coupled" to another element or there may be still another element interposed therebetween.

All terms used herein including technical or scientific terms have the same meanings as meanings generally understood by those having ordinary skill in the art to which the present disclosure pertains unless they are differently defined. Terms defined in a generally used dictionary should be construed to have meanings matching those in the context of a related art and should not be construed as ideal or excessively formal meanings unless they are clearly defined in the present specification. When a component, device, element, or the like of the present disclosure is described as having a purpose or performing an operation, function, or the like, the component, device, or element should be considered herein as being "configured to" meet that purpose or to perform that operation or function.

A method of controlling a vehicle including an inertia driving guide function according to the related art uses a tollgate as one event for control. However, the method of controlling the vehicle does not perform the control depending on the type of road and the type of tollgate.

Figure 2:
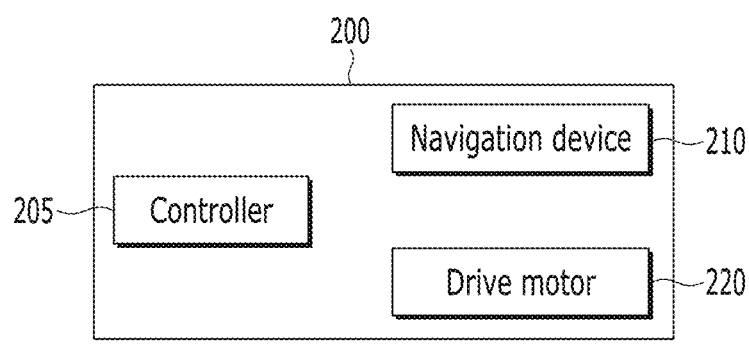
FIG. 2 is a block diagram illustrating an electrified vehicle to which the method of controlling inertia driving of an electrified vehicle illustrated in FIG. 1 is applied.

FIG. 1 is a flowchart for describing a method of controlling inertia driving of an electrified vehicle according to an embodiment of the present disclosure. FIG. 2 is a block diagram illustrating an electrified vehicle to which the method of controlling inertia driving of an electrified vehicle illustrated in FIG. 1 is applied.

Referring to FIGS. 1 and 2, in a reception operation 100, a controller 205 included in an electrified vehicle 200 may receive speed limit information of a front road on which the electrified vehicle is to travel through a navigation device 210. For example, the navigation device 210 may receive road information, such as speed limit information of a road or tollgate information related to a road from a server (for example, a server of an intelligent transport system (ITS), or a telematics server) installed (located) outside the vehicle. The type of tollgate received by the controller 205 through the navigation device 210 may include a general tollgate, a non-stop tollgate, a wide tollgate having two or more roads, an open tollgate, or a closed tollgate. In another embodiment of the present disclosure, the controller 205 may receive speed limit information of a front road on which the electrified vehicle is to travel from a camera of the electrified vehicle 200 that senses speed limit information on a sign of the road.

As illustrated in FIG. 2, the electrified vehicle (or environment-friendly vehicle) 200 may include the controller 205, the navigation device 210, and a drive motor 220, such as an electric motor.

The navigation device 210 may include a global positioning system (GPS) receiver that generates position information of the electrified vehicle 200.

The drive motor 220 may be operated as a generator in inertia driving of the electrified vehicle 200 and supply generative energy to the battery of the electrified vehicle. The battery is formed of a plurality of unit cells and a voltage, for example, direct-current high voltage of 350 V to 450 V, to be provided to the drive motor 220 that provides driving force to the wheels (or driving wheels) of the electrified vehicle 200 may be stored in the battery.

The controller 205 may control the overall operation of the electrified vehicle 200 as an electronic control unit (ECU). The controller 205 may be, for example, one or more microprocessors operated by a program (control logic) or hardware (for example, a microcomputer) including the microprocessor. The program may include a series of instructions for performing the method of controlling inertia driving of the electrified vehicle according to the embodiment of the present disclosure. The instruction may be stored in a memory of the vehicle 200 or the controller 205.

According to an operation 110 illustrated in FIG. 1, the controller 205 may determine whether the front road on which the electrified vehicle 200 is to travel is a highway including a high-speed road based on the road information received (provided) from the navigation device 210.

The method of controlling inertia driving of the electrified vehicle may proceed to an operation 125 when the front road on which the electrified vehicle 200 is to travel is the highway. The method of controlling inertia driving of the electrified vehicle may proceed to an operation 115 when the road on which the electrified vehicle 200 is to travel is a general road, which is not the highway.

According to the operation 115, the controller 205 may determine whether the general tollgate is located on the general road based on the information received from the navigation device 210. The general tollgate may be the tollgate that requires a stop because a toll collection system (for example, a Hi-pass system (or hi-pass device)) for collecting road tolls through wireless communication is not installed.

The method of controlling inertia driving of the electrified vehicle may proceed to the operation 100 when the general tollgate is not located on the general road. The method of controlling inertia driving of the electrified vehicle may proceed to an operation 120 when the general tollgate is located on the general road.

According to the operation 120, the controller 205 may determine (set) a target speed of the electrified vehicle 200 in the general tollgate to 0.

The controller 205 may control the drive motor 220 of the electrified vehicle so that the electrified vehicle performs inertia driving to be decelerated to a target speed based on the target speed of the electrified vehicle 200. The inertia driving means that the vehicle travels by inertia in a state where both an accelerator pedal and a brake pedal of the electrified vehicle are off by a driver of the electrified vehicle 200. During the inertia driving, the vehicle deceleration may be implemented only with driving resistance and the drive motor of the vehicle without friction braking. An embodiment of the method of controlling the inertia driving is disclosed in Korean Patent Application Laid-Open No. 10-2019-0001704 (U.S. Patent Laid-Open Publication No. US 2019/0001984).

The inertia driving guide function through a display device of the navigation device included in the method of controlling inertia driving of the electrified vehicle may induce the driver of the electrified vehicle to decelerate when the tollgate that is the deceleration event in front of the electrified vehicle is present to improve fuel efficiency of the electrified vehicle.

According to the operation 125, the controller 205 may determine whether the non-stop tollgate is located on the highway based on the information received from the navigation device 210. The non-stop tollgate may be the tollgate that does not require deceleration of the vehicle because a Hi-pass system, which is one example of a toll collection system for collecting road tolls through wireless communication, is installed on the road.

The method of controlling inertia driving of the electrified vehicle may proceed to an operation 128 when the non-stop tollgate is located on the highway. The method of controlling inertia driving of the electrified vehicle may proceed to an operation 130 when the non-stop tollgate is not located on the highway.

According to the operation 128, the controller 205 may determine a speed limit of the highway as the target speed of the electrified vehicle 200 in the non-stop tollgate. The controller 205 may control the drive motor 220 of the electrified vehicle so that the electrified vehicle 200 does not perform inertia driving based on the target speed of the electrified vehicle 200 and the speed of the electrified vehicle becomes the target speed.

According to the operation 130, the controller 205 may determine whether the general tollgate, in which the Hi-pass system is not usable, is located on the highway based on the information received from the navigation device 210.

The method of controlling inertia driving of the electrified vehicle may proceed to an operation 145 when the general tollgate, in which the Hi-pass system is not usable, is located on the highway. The method of controlling inertia driving of the electrified vehicle may proceed to an operation 135 when the general tollgate, in which the Hi-pass system is not usable, is not located on the highway.

According to the operation 145, the controller 205 may determine the target speed of the electrified vehicle 200 in the general tollgate to 0. The controller 205 may control the drive motor 220 of the electrified vehicle so that the electrified vehicle performs inertia driving to be decelerated to a target speed based on the target speed of the electrified vehicle 200.

According to the operation 135, the controller 205 may determine whether a signal indicating whether the Hi-pass system is used in the electrified vehicle 200 is received from the navigation device 210 by the controller and whether a first tollgate is located on the highway. For example, whether the Hi-pass system is used in the electrified vehicle 200 may be set by the driver of the vehicle in a user setting mode (USM) of the navigation device 210 of the vehicle 200 or a cluster. The Hi-pass system of the electrified vehicle may include a vehicle terminal (or a Hi-pass terminal). The vehicle terminal communicates wirelessly with a tollgate toll settlement server installed on the road and automatically settles tolls of the vehicle and a smart card (or a Hi-pass card), which is inserted or mounted to the vehicle terminal and loaded with a prepaid amount to pay tolls.

The method of controlling inertia driving of the electrified vehicle may proceed to an operation 145 when the signal indicating that the Hi-pass system is not used in the electrified vehicle 200 is received from the navigation device 210 and the first tollgate is located on the highway. The method of controlling inertia driving of the electrified vehicle may proceed to an operation 140 when the signal indicating that the Hi-pass system is used in the electrified vehicle 200 is received from the navigation device 210 and the first tollgate is not located on the highway.

According to the operation 140, the controller 205 may determine whether the smart card that pays or settles tolls of the vehicle is inserted into the vehicle terminal of the Hi-pass system and a second tollgate is located on the highway.

The method of controlling inertia driving of the electrified vehicle may proceed to the operation 145 when the smart card that pays or settles tolls of the vehicle is not inserted into the vehicle terminal of the Hi-pass system and the second tollgate is located on the highway. The method of controlling inertia driving of the electrified vehicle may proceed to an operation 150 when the smart card that pays tolls of the vehicle is inserted into the vehicle terminal of the Hi-pass system and the second tollgate is not located on the highway.

According to the operation 150, the controller 205 may determine whether the wide tollgate is located on the highway based on the information received from the navigation device 210. The wide tollgate may be the tollgate having two or more roads and the Hi-pass system installed. A difference between the speed limit of the highway and a speed limit (for example, 80 kph, i.e., about 50 mph) of the road of the wide tollgate may be equal to or less than a reference value (for example, 30 kph, i.e. about 18 mph).

The method of controlling inertia driving of the electrified vehicle may proceed to an operation 160 when the wide tollgate is located on the highway. The method of controlling inertia driving of the electrified vehicle may proceed to an operation 165 when the wide tollgate is not located on the highway.

According to the operation 160, the controller 205 may determine the speed limit of the road of the wide tollgate as the target speed of the electrified vehicle 200 in the wide tollgate. The controller 205 may control the drive motor 220 of the electrified vehicle so that the electrified vehicle performs inertia driving to be decelerated to a target speed based on the target speed of the electrified vehicle 200.

According to the operation 165, the controller 205 may determine whether the open tollgate is located on the highway based on the information received from the navigation device 210. The open tollgate may be the tollgate, which does not issue a road ticket of the highway, includes the Hi-pass system installed, and is located within a main road of the highway.

The method of controlling inertia driving of the electrified vehicle may proceed to an operation 175 when the open tollgate is located on the highway. The method of controlling inertia driving of the electrified vehicle may proceed to an operation 168 when the open tollgate is not located on the highway.

According to the operation 175, the controller 205 may determine a speed limit of the highway as the target speed of the electrified vehicle 200 in the open tollgate. The controller 205 may control the drive motor 220 of the electrified vehicle so that the electrified vehicle 200 does not inertia-travel and the speed of the electrified vehicle has the target speed based on the target speed of the electrified vehicle 200.

According to the operation 168, the controller 205 may determine whether the closed tollgate is located on the highway based on the information received from the navigation device 210. The closed tollgate may be the tollgate, which issues a road ticket of the highway, includes the Hi-pass system installed, and is located on a road separated from a main road of the highway.

According to the operation 170, the controller 205 may determine the speed limit of the road of the closed tollgate as the target speed of the electrified vehicle 200 in the closed tollgate. The controller 205 may control the drive motor 220 of the electrified vehicle so that the electrified vehicle performs inertia driving to be decelerated to a target speed based on the target speed of the electrified vehicle 200.

The constituent element, " . . . unit", a block, or a module used in the embodiment of the present disclosure may be implemented by software, such as a task, class, subroutine, process, object, execution thread, and program performed in a predetermined area of a memory, or hardware, such as field-programmable gate array (FPGA) or an application-specific integrated circuit (ASIC), and may also be implemented by a combination of the software and the hardware. The constituent element, " . . . unit" or the like may also be included in a computer readable storage medium, and a part thereof may be distributed in the plurality of computers.

As described above, the embodiments have been disclosed in the drawings and the specification. Specific terms are used herein but are only used for the purpose of describing the present disclosure. These terms should not be used to limit the meaning or scope of the present disclosure described in the claims. Accordingly, those having ordinary skill in the art should appreciate that various modifications and equivalent embodiments may be made without departing from the scope and spirit of the present disclosure. Therefore, the true technical protection scope of the present disclosure should be defined by the technical spirit of the accompanying claims.

DESCRIPTION OF SYMBOLS

205: Controller
210: Navigation device
220: Drive motor

What is claimed is:

1. A method of controlling inertia driving of an electrified vehicle, the method comprising:
determining, by a controller, a target speed of the electrified vehicle based on a type of tollgate in front of the electrified vehicle;
controlling, by the controller, a drive motor of the electrified vehicle so that the electrified vehicle performs inertia driving to be decelerated to the target speed;
determining, by the controller, whether a non-stop tollgate, which does not require deceleration of the electrified vehicle because a toll collection system for collecting road tolls through wireless communication is installed, is located on a highway on which the electrified vehicle is to travel based on information received from a navigation device of the electrified vehicle;
when the non-stop tollgate is located on the highway, determining, by the controller, a speed limit of the highway as a target speed of the electrified vehicle in the non-stop tollgate;
when the non-stop tollgate is not located on the highway, determining, by the controller, whether a general tollgate, in which a toll collection system for collecting road tolls through wireless communication is not installed, is located on the highway based on the information received from the navigation device; and when the general tollgate is not located on the highway, determining, by the controller, whether a signal indicating whether the toll collection system is used in the electrified vehicle is received from the navigation device and whether a first tollgate is located on the highway, wherein, when the general tollgate is determined to be located on the highway, the controller determines a target speed of the electrified vehicle in the general tollgate to be 0 and sets the target speed to 0, and wherein, when a signal indicating that the toll collection system is not used in the electrified vehicle is received from the navigation device and the first tollgate is determined to be located on the highway, the controller determines the target speed of the electrified vehicle in the first tollgate to be 0 and sets the target speed to 0.

2. The method of claim 1, further comprising:

when the signal indicating that the toll collection system is used in the electrified vehicle is received from the navigation device and the first tollgate is not located on the highway, determining, by the controller, whether a smart card that pays tolls of a vehicle is inserted into a vehicle terminal of the toll collection system and a second tollgate is located on the highway, wherein, when the smart card is not inserted into the vehicle terminal of the toll collection system and the second tollgate is determined to be located on the highway, the controller determines the target speed of the electrified vehicle in the second tollgate to be 0 and sets the target speed to 0.

3. The method of claim 2, further comprising:

determining, by the controller, whether a wide tollgate, which has two or more roads and the toll collection system installed, is located on the highway based on the information received from the navigation device, wherein, when a difference between a speed limit of the highway and a speed limit of a road of the wide tollgate is equal to or smaller than a reference value, and when the wide tollgate is located on the highway, the controller determines the speed limit of the road of the wide tollgate as a target speed of the electrified vehicle in the wide tollgate.

4. The method of claim 3, further comprising:

determining, by the controller, whether an open tollgate, which does not issue a road ticket of the highway, has the toll collection system installed, and is located within a main road of the highway, is located on the highway based on the information received from the navigation device, wherein, when the open tollgate is located on the highway, the controller determines a speed limit of the highway that is not related to an inertia driving speed of the electrified vehicle as a target speed of the electrified vehicle in the open tollgate.

5. The method of claim 4, further comprising:

determining, by the controller, whether a closed tollgate, which issues a road ticket of the highway, has the toll collection system installed, and is located on a road separated from a main road of the highway, is located on the highway based on the information received from the navigation device, wherein, when the closed tollgate is located on the highway, the controller determines a speed limit of the road of the closed tollgate as the target speed of the electrified vehicle in the closed tollgate.

\* \* \* \* \*